J. GREEN.
COLLAPSIBLE GRAMOPHONE.
APPLICATION FILED DEC 7, 1921.

1,429,340.

Patented Sept. 19, 1922.
3 SHEETS—SHEET 1.

Inventor:
Joshua Green
By Louis Prevost Whitaker
Atty

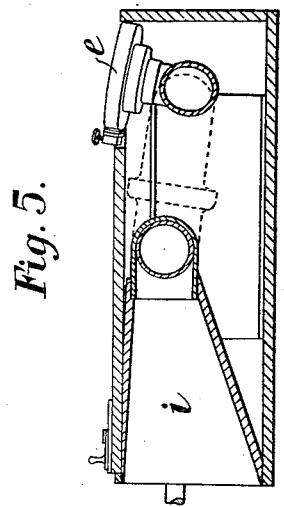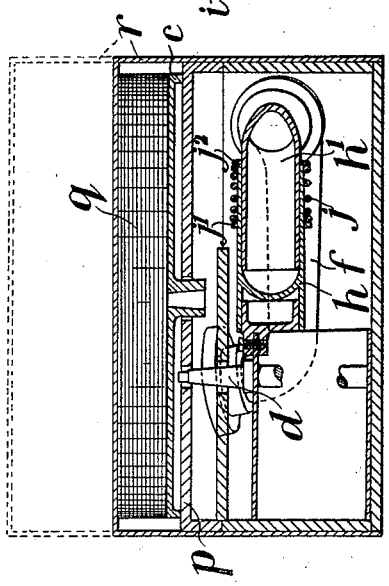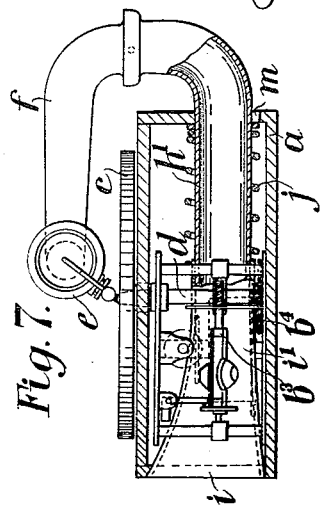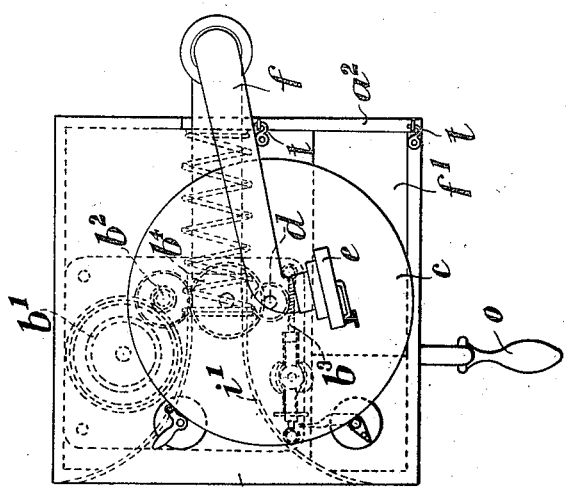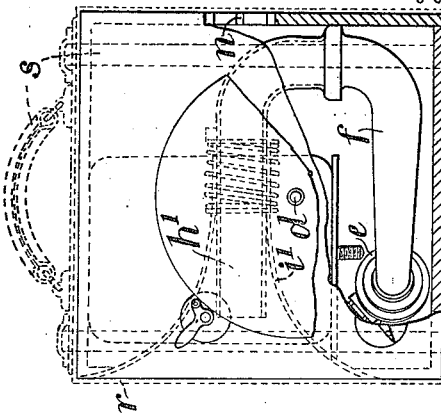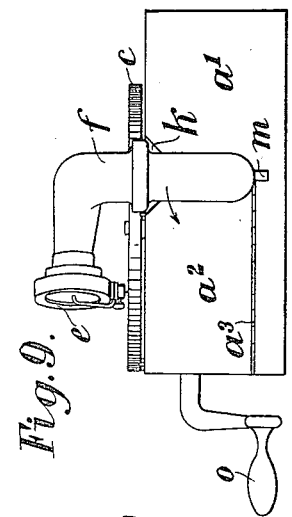

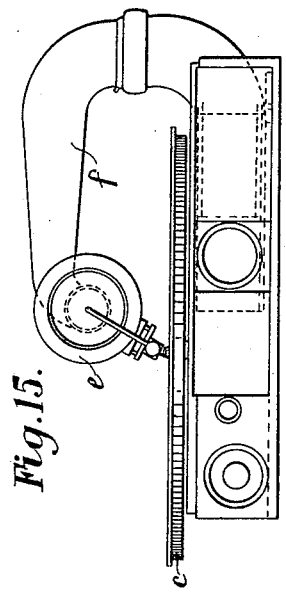
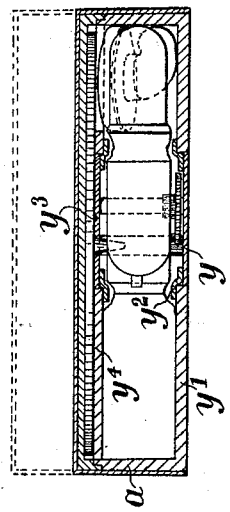
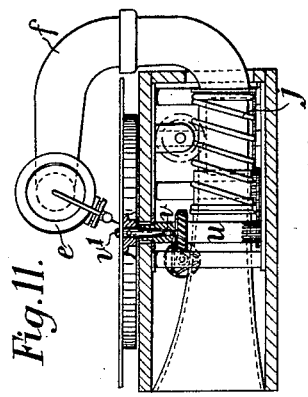
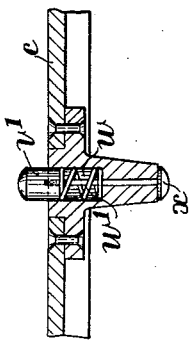
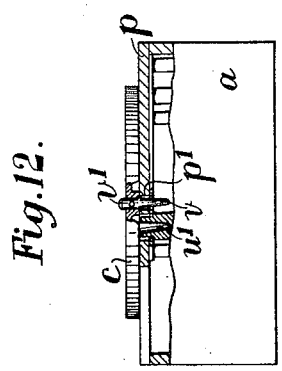
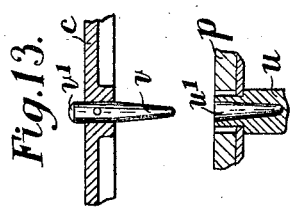

Patented Sept. 19, 1922.

1,429,340

UNITED STATES PATENT OFFICE.

JOSHUA GREEN, OF HOVE, ENGLAND

COLLAPSIBLE GRAMOPHONE.

Application filed December 7, 1921. Serial No. 520,559.

*To all whom it may concern:*

Be it known that I, JOSHUA GREEN, a subject of the King of Great Britain, residing at 38 Rutland Gardens, Hove, Sussex, England, have invented new and useful Improvements in Collapsible Gramophones, of which the following is a specification.

This invention relates to collapsible gramophones of the kind in which the tone-arm can be folded within the case of the machine when out of use and has for its object to improve the construction of this type of machine so that when collapsed it occupies a smaller space than hitherto.

According to the invention the tone-arm is arranged so that it can be turned down or folded within the case of the machine or into the plane of the motor when out of use, around a horizontal axis or axis parallel with the surface of the turntable.

In a suitable arrangement for carrying out the invention the sound tube leading from the universal joint of the tone-arm to the sound amplifying chamber or horn is formed in two horizontal portions telescoping together, one portion being fixed so that when the tone-arm is in the turned down or folded position, the other or movable portion connected to the said universal joint will be pushed towards the said fixed portion, whereas when the tone-arm is turned up into position for use, the movable portion will be extended from the said fixed portion, suitable means being provided for preventing the said movable portion from turning relatively to the fixed portion when in the extended position.

The fixed portion of the aforesaid sound tube is attached to the motor of the machine and is provided with a collar, between which and a collar on the movable portion of the tube, is arranged a compression spring which is compressed when the movable tube portion is moved towards the fixed portion to enable the tone-arm to be turned down within the case, but which, when the tone-arm is turned up into position for use, will expand and extend the said movable portion. An opening is provided in the wall of the case to allow of this extended movement and a stop on the movable tube portion to determine the extent of such movement. Means such as a rib on the movable part of the sound tube engaging a corresponding notch or recess in the case are also provided to maintain the tone-arm in the upright position.

In a modification I arrange the horn or sound amplifying chamber to pass from the back to the front of the instrument through the motor, whereby the dimensions of the enclosing case between the sides thereof can be considerably reduced and at the same time the said horn or amplifying chamber is disposed more or less symmetrically between such sides.

In this arrangement the horn or amplifying chamber is made in the form of a tapering tube with a flaring mouth, the stem of the horn passing through the motor between the drum containing the driving spring and one of the arbors driven by the said drum, on the one hand, and the turntable spindle to which is geared the governor mechanism, on the other hand, the said drum and spindle being separated by a greater distance than usual to allow of this and an idle gear wheel or wheels employed to bridge the gap thus produced in the motor mechanism.

The tone-arm, which projects through the back of the case when in position for use, is turned on its side and slid beneath the top of the case and the side of the motor, when folded or out of use, and to allow of this the turn-table is removed from its spindle and a portion of the said back is hinged so that it can be turned down out of the way of the tone-arm when the latter is so turned on its side.

To enable the height of the machine to be further reduced when packed for transport, the motor driving spindle may be made shorter than usual and its upper end made hollow or in the form of a socket, the underside of the turn-table being provided with a central downward projection or spigot designed to fit within the said socket when in position for use.

In practice the socket and spigot are slightly tapered to ensure a tight fit between them. Or other suitable means may be employed for keying them together.

In a further modification, the usual pin on the turn-table for engagement with the central holes in the records is made collapsible, so that when the machine is packed for transport, the said pin can be pressed down flush with the surface of the said table to enable the enclosing cover to lie close against the said table without requiring any recessed formation in the cover to receive the said pin. This construction is advantageously effected by providing a recess in the turntable or the spigot, into which recess the said pin fits, a helical spring being placed below the pin. The latter is prevented from withdrawal from the recess by a headed screw passed up through a hole in the spigot and screwing into the pin.

The dimensions of the height of the case of gramophones are also reduced by arranging the upper and lower frame plates of the motor within recesses in the top and bottom of the said case, so that the outer surfaces of the said plates and top and bottom of the case are flush, suitable stays or connections being made between the said plates and the case for securing the plates to the latter, for instance, angled pieces of sheet metal secured by screws.

To enable the invention to be fully understood, I will describe it by reference to the accompanying drawings, in which:—

Figure 4 is a plan of the machine showing the tone-arm turned down into the "out-of-use" position and Figure 5 is a section on the line 5—5, Figure 4.

Figure 6 is a section on the line 6—6, Figure 4.

Figures 7 and 8 are views similar to Figures 1 and 2, respectively, illustrating a modification and Figure 9 is a rear view thereof.

Figure 10 is a plan thereof with the tone-arm in the "out-of-use" position.

Figure 11 is a sectional side view illustrating another modification of the machine and Figure 12 is a sectional view at right angles thereto but showing some of the parts in the collapsed position.

Figure 13 is a sectional view of details thereof drawn to a larger scale.

Figure 14 is a sectional elevation of a modification of the said detail.

Figure 15 is a side elevation of a machine similar to that shown in Figure 1 illustrating a further modification of the machine and Figure 16 is a sectional view at right angles thereto showing the tone-arm turned down out of use.

Figure 3:
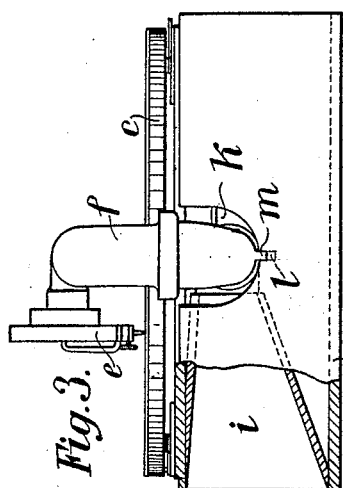
Figure 3 is a sectional rear elevation.
Figure 4:
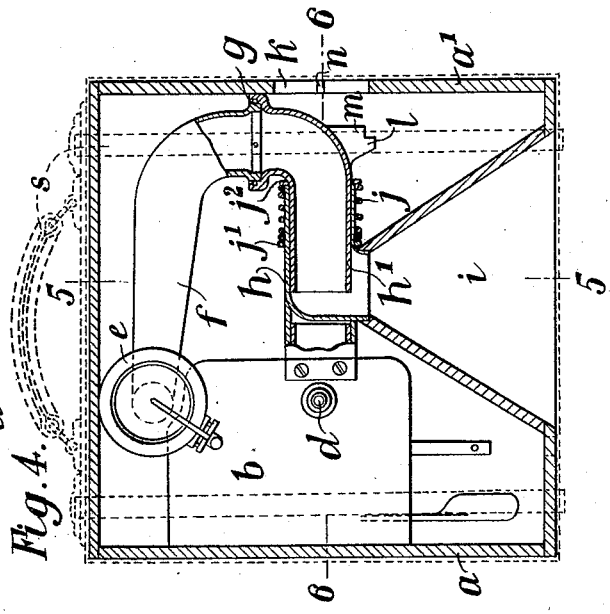
Figure 1:
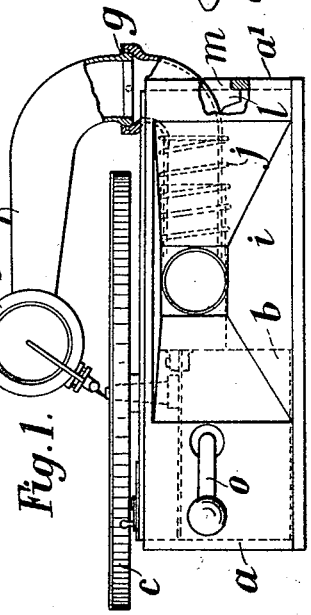
Figure 1 is a side elevation of a gramophone constructed in accordance with the invention.
Figure 2:
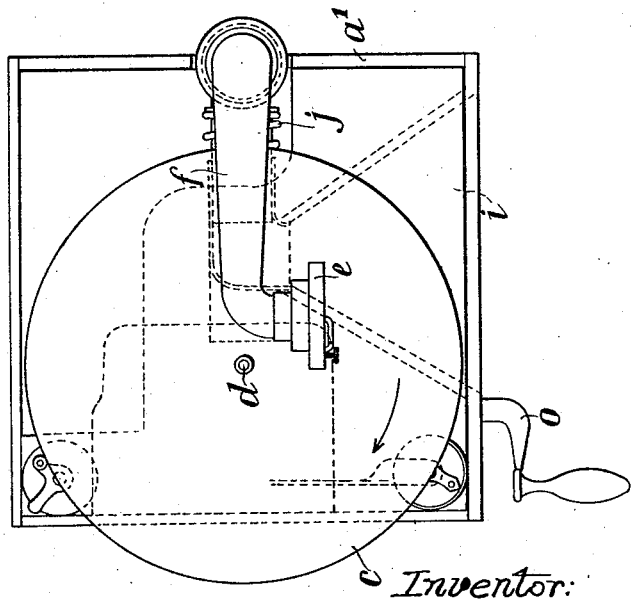
Figure 2 is a plan thereof.

Referring to Figures 1 to 6, $a$ is the case of the machine, $b$ the motor and $c$ the turntable detachably supported upon the driving spindle $d$ of the motor in the known manner. $e$ is the sound-box carried at one end of the tone-arm $f$, the other end of which is supported by the universal joint $g$ on the horizontal telescopic sound-tube $h$, $h^1$ which conveys the sound from the sound-box $e$ to the amplifying chamber or horn $i$. $h$ is the fixed part of the sound-tube it being attached to the motor $b$ whilst the part $h^1$ telescopes within the part $h$ to enable the tone-arm to be turned down within the case $a$ as indicated, for instance, in figure 4 against the pressure of the compression spring $j$ arranged between collars $j^1$ and $j^2$ on the tubes $h$ and $h^1$ respectively. By turning the tone-arm into the upright position, the spring $j$ will be enabled to extend the portion $h^1$ of the sound-tube so as to pass into the opening $k$ in the back wall $a^1$ of the case $a$ whereby the tone arm assumes the position for use indicated in Figures 1 to 3. $l$ is the stop-piece on the tube $h^1$ limiting this outward movement whilst $m$ is the rib also on the said tube $h^1$ to engage the corresponding notch or recess $n$ in the case $a$ and maintain or lock the tone-arm in the said upright position.

To collapse the machine for transport the tube $h^1$ is telescoped within the tube $h$ so as to withdraw the rib $m$ from the notch $n$. The tone-arm $f$ can then be turned down into the position indicated in Figures 4, 5 and 6. The winding handle $o$ is then placed within the case and the turntable $c$ removed from the spindle $d$ and placed upon a loose platform $p$, Figure 6, the said platform being first placed in position upon the top of the case $a$ and being provided with holes for the passage therethrough of the said spindle $d$ and the boss of the turntable. A number of records $q$ are then placed upon the turntable $c$ and a cover $r$ placed over them so as to fit over and telescope on to the case $a$ until it rests on the said records. An ordinary carrying strap $s$ is then placed around the the case $a$ and cover $r$ as indicated by the dotted lines in figure 4. In figure 6 the cover $r$ is also indicated by dotted lines in a position that it would assume if a larger number of records were carried.

When the machine is in use the cover $r$ can serve as a container for the records.

In the construction illustrated in Figures 7 to 10 the stem $i^1$ of the horn or amplifying chamber $i$ passes through the motor $b$ and is provided with an expanding mouth opening at the front of the case $a$ and the tube $h^1$ slides within the said stem. The stem $i^1$ passes through the motor between the drum $b^1$ containing the driving spring and one of the arbors $b^2$ driven by the said drum on the one hand, and the turntable spindle $d$ to which is geared the governor mechanism $b^3$ on the other hand, $b^4$ being the idle gear wheel for bridging the gap thus produced on the motor.

When in position for use, the tube $h^1$ is extended from the said stem $i^1$ by the spring $j$ and fits within the opening $k$ in the back $a^1$ of the case, as in the construction illustrated in Figures 1 to 6, and is prevented from turning therein by the key-piece or rib $m$ on the tube $h^1$ fitting within the notch $n$ in the said back.

$a^2$ is the portion of the back $a^1$ of the case, which is hinged at $a^3$ so that it can be turned back to allow the tone-arm $f$ to be turned in the direction of the arrow, Figure 9, and placed within the case $a$ after being first slightly pushed in against the pressure of the spring $j$ so as to disengage the key-piece $m$ from the notch $n$. The tone-arm $f$ can then be turned down through a space $f^1$ in the top of the case $a$ (the turntable $c$ being first removed from the spindle $d$) and the tube $h^1$ slid within the stem $i^1$ against the pressure of the spring $j$, so that the said tone-arm assumes the position indicated in Figure 10, the hinged portion $a^2$ of the back of the case then being returned to its upright or normal position and secured by the hooks $t$ to hold the tone-arm within the case. The turntable $c$ is then placed back in position on its spindle $d$ and the winding handle $o$ placed beside it on the top of the case and, if it be required to transport the instrument, together with a supply of records, the latter are laid on the turntable, and a cover $r$, as in the arrangement illustrated in Figure 6, is fitted on to the case to cover the records, turntable and winding handle, an ordinary carrying strap $s$ being then placed around the case $a$ and cover as indicated by the dotted lines in Figure 10. The cover and strap are indicated by dotted lines.

Figures 11 and 12 illustrate the construction wherein the motor driving spindle $u$ is shorter than usual and its upper end made hollow or in the form of a socket $u^1$. $v$ is the central downwardly projecting spigot or projection on the underside of the turntable $c$ designed to fit within the socket $u^1$ to ensure the rotation of said spindle being communicated to the turntable, the parts being formed slightly taper for this purpose; or they may be keyed together. The usual centre pin or stud $v^1$ on the turntable for engagement with the central hole in the records is conveniently formed by an upward extension of the spigot $v$. In the drawing, the spigot $v$ is shown as formed independently, of, but riveted to the turntable, but it may be formed integral with the said turntable.

By the described construction it will be seen that the usual upper projecting end of the motor driving spindle being now dispensed with, the turntable, when disconnected from the motor, can be placed nearer to the motor than heretofore, as indicated in Figure 12, a hole $p^1$ being provided in the platform $p$ covering the motor through which hole the spigot $v$ on the turntable passes to enable the said turntable to lie snugly upon the said platform.

In Figure 14 is shown the arrangement where the centre pin $v^1$ of the turntable $c$ is made collapsible so that it can be pressed down 'flush with the surface of the said turntable. $w$ is the recess within which the said pin is located and into which it can telescope, $w^1$ being the spring arranged within the said recess for pressing the pin upwardly and $x$ the headed pin for limiting the upward movement of the pin, the said pin passing up through a hole in the spigot $v$ and screwing into the pin $v^1$.

Figures 15 and 16 show a machine in which the height is further reduced by as-ranging the lower frame plate $y$ of the motor $b$ so that its lower surface is flush with the bottom $y^1$ of the case $a$, $y^2$ indicating the angled pieces of sheet metal for securing the said plate and bottom together. I have also indicated the upper frame plate $y^3$ of the motor with its upper surface flush with the upper surface of the top $y^4$ of the case $a$ for the purpose of reducing the height of the machine still further, the said plate being secured in position by angled pieces similar to the pieces $y^2$.

Claims:

1. In a gramophone, the combination with an amplifying horn, a horizontal sound tube connected therewith and provided with an upwardly curved portion, and a tone arm swiveled on and supported by the upwardly curved portion of the sound tube, said sound tube being formed of tubular sections, one of which surrounds the other, and is capable of rotating thereon to permit the tone arm to be folded into closed position, and means for detachably securing the tone arm in operative position.

2. In a gramophone, the combination with an amplifying horn, of a horizontal sound tube comprising telescoping sections having slidable and rotary movement with respect to each other, one of said sections being provided with an upwardly extending portion, a tone arm pivotally mounted on said upwardly extending portion so as to swing laterally with respect thereto, and means for locking the tone arm and connected portion of the sound tube in operative position, brought into operation by the longitudinal sliding movement of the sound tube sections with respect to each other.

3. In a gramophone, the combination with an amplifying horn, of a horizontal sound tube comprising telescoping sections having a slidable and rotary movement with respect to each other, one of said sections being stationary and connected to the horn, and the other section being movable and provided with a curved portion, a tone arm swiveled to said curved portion, and interlocking devices, the one being stationary and the other carried by the movable section of the sound tube, for holding the tone arm in operative position, said interlocking devices being brought into and out of engagement by the longitudinal movement of the movable sound tube section.

4. In a gramophone, the combination with an amplifying horn, of a horizontal sound tube comprising telescoping sections having a slidable and rotary movement with respect to each other, one of said sections being stationary and connected to the horn, and the other section being movable and provided with a curved portion, a tone arm swiveled to said curved portion, and interlocking devices, the one being stationary and the other carried by the movable section of the sound tube, for holding the tone arm in operative position, said interlocking devices being brought into engagement by the longitudinal movement of the movable sound tube section, and a spring for normally holding said interlocking devices in engagement.

5. In a gramophone, the combination with an amplifying horn, of a horizontal sound tube comprising telescoping sections having a slidable and rotary movement with respect to each other, one of said sections being stationary and connected to the horn, and the other section being movable and provided with a curved portion, a tone arm swiveled to said curved portion, and interlocking devices, the one being stationary and the other carried by the movable section of the sound tube, for holding the tone arm in operative position, said interlocking devices being brought into engagement by the longitudinal movement of the movable sound tube section, and a coiled spring having one end connected to the movable sections of the sound tube, and the other end connected to a stationary part, said spring acting rotarily for normally holding the movable sound tube section and tone arm in operative position, and longitudinally to hold said interlocking devices in engagement with each other.

6. In a gramophone, the combination with a casing, provided with an amplifying horn, motor and turntable, of a sound tube comprising a tubular section connected with the horn, and a movable telescoping section rotatable and longitudinally slidable thereon, said movable section having a curved portion, and a tone arm swiveled thereto, said casing having an aperture in line with the said movable section to permit its projection longitudinally therethrough, and means for supporting the movable section of the sound tube and the tone arm in operative position when projected, said casing being provided with a space for receiving the tone arm and connected portion of the sound tube in folded and retracted position.

7. In a gramophone, the combination with a casing, provided with an amplifying horn, motor and turntable, of a sound tube comprising a tubular section connected with the horn, and a movable telescoping section rotatable and longitudinally slidable thereon, said movable section having a curved portion, and a tone arm swiveled thereto, said casing having an aperture in line with the said movable section to permit its projection longitudinally therethrough, interlocking parts carried respectively by the casing and the movable section of the sound arm for locking the latter and the tone arm in operative projected position, said casing being provided with a space for receiving the tone arm and connected portion of the sound tube in folded and retracted position.

8. In a gramophone, the combination with a casing, provided with an amplifying horn, motor and turntable, of a sound tube comprising a tubular section connected with the horn, and a movable telescoping section rotatable and longitudinally slidable thereon, said movable section having a curved portion, and a tone arm swiveled thereto, said casing having an aperture in line with the said movable section to permit its projection longitudinally therethrough, interlocking parts carried respectively by the casing and the movable section of the sound tube for locking the latter and the tone arm in operative position, and a spring interposed between the sections of the sound tube for holding the movable section in projected position and said interlocking parts in engagement.

9. In a gramophone, the combination with a casing, provided with an amplifying horn, motor and turntable, of a sound tube comprising a tubular section connected with the horn, and a movable telescoping section rotatable and longitudinally slidable thereon, said movable section having a curved portion, and a tone arm swiveled thereto, said casing having an aperture in line with the said movable section to permit its projection longitudinally therethrough, interlocking parts carried respectively by the casing and the movable section of the sound tube for locking the latter and the tone arm in operative position, and a coiled spring interposed between the sections of said sound tube and having one end secured with respect to each, said spring acting rotarily to hold the movable sound tube section and tone arm in operative position, and longitudinally to hold them in projected position and said interlocking devices in engagement.

10. In a gramophone, the combination with a casing, provided with an amplifying horn, motor and turn table, of a sound tube comprising two telescoping sections rotatable and longitudinally slidable with respect to each other, one section being connected to the horn, and the other section being movable and having a curved portion, and a tone arm swiveled to said curved portion, said casing having an aperture in a lateral wall to permit the section of the sound tube connected with the tone arm to be projected therethrough, and a locking notch in the casing, a locking lug on the movable sound tube section to engage said notch when the parts are in projected and operative position.

11. In a gramophone, the combination with a casing, provided with an amplifying horn, motor and turntable, of a sound tube comprising two telescoping sections rotatable and longitudinally slidable with respect to each other, one section being connected to the horn, and the other section being movable and having a curved portion, and a tone arm swiveled to said curved portion, said casing having an aperture in a lateral wall to permit the section of the sound tube connected with the tone arm to be projected therethrough, a locking notch in the casing, a locking lug on the movable sound tube section to engage said notch when the parts are in projected and operative position, a spring engaging the movable sound tube section for normally holding the same in projected position, and a stop for limiting the longitudinal movement of said section by said spring.

12. In a gramophone, the combination with a casing, provided with an amplifying horn, motor and turntable, of a sound tube comprising two telescoping sections rotatable and longitudinally slidable with respect to each other, one section being connected to the horn, and the other section being movable and having a curved portion, and a tone arm swiveled to said curved portion, said casing having an aperture in a lateral wall to permit the section of the sound tube connected with the tone arm to be projected therethrough, a locking notch in the casing, a locking lug on the movable sound tube section to engage said notch when the parts are in projected and operative position, and a coiled spring having one end secured to said movable sound tube section and the other end secured to a stationary part, said spring acting circularly to normally hold the tone arm and connected section of the sound tube in operative position, and longitudinally to hold said parts in projected position with said notch and lug in engagement.

JOSHUA GREEN.